United States Patent [19]

Brenner et al.

[11] Patent Number: 4,931,959

[45] Date of Patent: Jun. 5, 1990

[54] OPTICAL SHUFFLE ARRANGEMENT

[75] Inventors: Karl-Heinz Brenner, Altdorf, Fed. Rep. of Germany; Alan Huang, Middletown, N.J.; Adolf W. Lohmann, Uttenreuth, Fed. Rep. of Germany

[73] Assignee: AT&T Bell Laboratories, Murray Hill, N.J.

[21] Appl. No.: 296,284

[22] Filed: Jan. 11, 1989

Related U.S. Application Data

[63] Continuation of Ser. No. 748,408, Jun. 24, 1985, abandoned.

[51] Int. Cl.[5] .......................... G06G 9/00; G02F 1/29

[52] U.S. Cl. .................................... 364/525; 364/514; 364/822; 364/827; 350/173; 350/162.12

[58] Field of Search ............... 364/525, 726, 746, 823, 364/824, 827, 514; 250/342, 574; 350/464, 170, 172, 173, 132, 420, 445, 556, 358, 162.12; 353/27 R, 82, 94; 356/406, 407; 358/225; 354/80

[56] References Cited

U.S. PATENT DOCUMENTS

| | | | |
|---|---|---|---|
| 3,439,972 | 4/1969 | Ratliff, Jr. | 350/132 |
| 3,872,293 | 3/1975 | Green | 350/162 SF |
| 3,944,739 | 3/1976 | Sword et al. | 358/225 |
| 3,944,820 | 3/1976 | Scotts | 250/227 |
| 4,082,440 | 4/1978 | Bennett | 353/82 |
| 4,088,410 | 5/1978 | Smith | 356/390 |
| 4,129,358 | 12/1978 | Wei | 350/173 |
| 4,129,365 | 12/1978 | Aversano et al. | 353/94 |
| 4,161,036 | 7/1979 | Morris et al. | 364/900 |
| 4,172,632 | 10/1979 | Holmes, Jr. | 350/132 |
| 4,187,000 | 2/1980 | Constant | 350/162 |
| 4,339,181 | 7/1982 | Link et al. | 353/27 R |
| 4,346,962 | 8/1982 | Holmes, Jr. | 350/132 |
| 4,418,394 | 11/1983 | Tai | 364/746 |
| 4,531,197 | 7/1985 | Lin | 364/822 |
| 4,558,925 | 12/1985 | Casseday et al. | 364/822 |
| 4,601,006 | 7/1986 | Liu | 364/726 |
| 4,650,297 | 3/1987 | Ishibai | 350/556 |
| 4,740,803 | 4/1988 | Hardy | 354/80 |

OTHER PUBLICATIONS

IEEE Transactions on Computers, Feb. 1971, "Parallel Processing with the Perfect Shuggle", H. S. Stone, pp. 153–161.

Proceedings of the IEEE, vol. 72, No. 7, Jul. 1984, "Optical Interconnections for VLSI Systems", J. W. Goodman et al., pp. 850–866.

Conference Record, IEEE Global Telecommunications Conference, vol. 1, Nov. 1984, "A Survey of Interconnection Network", R. J. McMillen, pp. 105–113.

*Primary Examiner*—Parshotam S. Lall
*Assistant Examiner*—V. N. Trans
*Attorney, Agent, or Firm*—Henry T. Brendzel

[57] ABSTRACT

An optical arrangement permutes elements of a multidimensional array by projecting an input element array onto an output via a plurality of optical paths. Each optical path provides a relative shift in its projection on the output plane whereby there is a prescribed permutation of elements.

13 Claims, 6 Drawing Sheets

OPTICAL SHUFFLE ARRANGEMENT

This application is a continuation of application Ser. No. 748,408, filed on June 24, 1985 now abandoned.

BACKGROUND OF THE INVENTION

Our invention relates to processing systems and more particularly to parallel processing systems using data shuffling arrangements. In large scale communication systems, switching functions adapted to accommodate wide band information require complex sorting operations in order to interconnect large numbers of subscribers. Similarly, many data processing systems need complex arrangements to perform functions such as fast Fourier transforms, polynomial evaluation, data sorting, and matrix manipulation. Many of these data processing operations may be accomplished by shuffling data elements in accordance with well-known algorithms.

The article, "Parallel Processing with the Perfect Shuffle," by Harold S. Stone appearing in the *IEEE Transactions on Computers,* February 1971, pp. 153-161, describes the application of the well-known perfect shuffle technique to such data processing and switching problems. U.S. Pat. No. 4,161,036 issued to S. Brent Morris et al, July 10, 1979, discloses random and sequential accessing techniques in dynamic memories utilizing shuffling operations. The perfect shuttle technique is well adapted to perform many switching and data processing functions, and high density logic circuits are available for its implementation. The complex interconnections required for electrical implementation of the shuffling process, however, are difficult to achieve using prior art arrangements. The article, "Optical Interconnections for VLSI Systems," by Joseph W. Goodman et al appearing in *Proceedings of the IEEE,* Vol. 72, No. 7, July 1984, pp. 850-866, discloses various optical interconnections between density integrated circuit chips which permit electrical circuit elements to perform large scale parallel processing involving rearrangement of information elements such as the perfect shuffle.

Optical systems performing data processing functions are well known in the art. U.S. Pat. No. 3,872,293, issued Mar. 18, 1975 to Eugene L. Green, discloses a multi-dimensional Fourier transform optical processor. U.S. Pat. No. 3,944,820, issued to Larry B. Stotts, Mar. 16, 1976, discloses a high speed optical matrix multiplier system using analog processing techniques. U.S. Pat. No. 4,187,000, issued Feb. 5, 1980 to James W. Constant, describes an analog addressable optical computer and filter arrangement. These patents rely on analog computation and are not applicable to processing of information based on perfect shuffle principles. U.S. Pat. No. 4,418,394, issued to Anthony M. Tai on Nov. 29, 1983, discloses an optical residue arithmetic computer having a programmable computation module in which optical paths are determined by electrical fields. It is an object of the invention to provide an improved optical shuffling arrangement adapted to perform optical parallel processing of digital information.

SUMMARY OF THE INVENTION

The invention is directed to an optical arrangement adapted to rearrange elements of a multi-dimensional array in which an element array is projected via a plurality of optical paths. Each optical path provides a relative shift in its projection of the element array whereby a prescribed permutation of elements is obtained.

According to one aspect of the invention, a perfect shuffle of elements is implemented by imaging a two-dimensional element matrix on a plane with a magnification factor of two by means of a beam splitter and mirrors tilted to shift one image with respect to the other.

DETAILED DESCRIPTION

Figure 1:
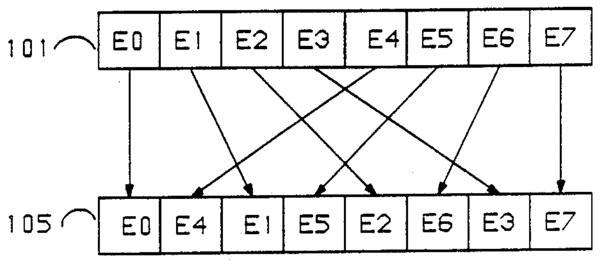
FIG. 1 is a simplified illustration of the perfect shuffle operation.

The perfect shuffle is an interconnection arrangement in which a set of informational elements E0, E1, . . . E7 is rearranged as a deck of cards is shuffled so that after the shuffle the elements of the two halves of the set alternate. FIG. 1 illustrates the rearrangement. Line 101 shows the initial set of elements in ascending order. Line 105 shows the shuffled elements set. The positions of elements E0 and E7 are unaltered. Element E4 is shifted from the fifth position in the original set to the second position in the shuffled set. Element E1 is shifted from the second position of the original set to the third position of the shuffled set. The other elements are rearranged as indicated so that the first half of the shuffled set is interleaved with the second half of the set. Where i is the element position, the perfect shuffle mapping may be expressed as $$P(i)=2i \text{ for } 0<=i<=N/2-1$$

$$P(i)=2i+1-N \text{ for } N/2<=i<N-1 \quad (1)$$

In binary representation shuffling may be accomplished by cyclinal rotation of the bit pattern of the element addresses in electronic circuits well known in the art. In accordance with the invention, the shuffling operations illustrated in FIG. 1 are carried out in an optical arrangement in a simpler manner at substantially higher speed.

Figure 2:
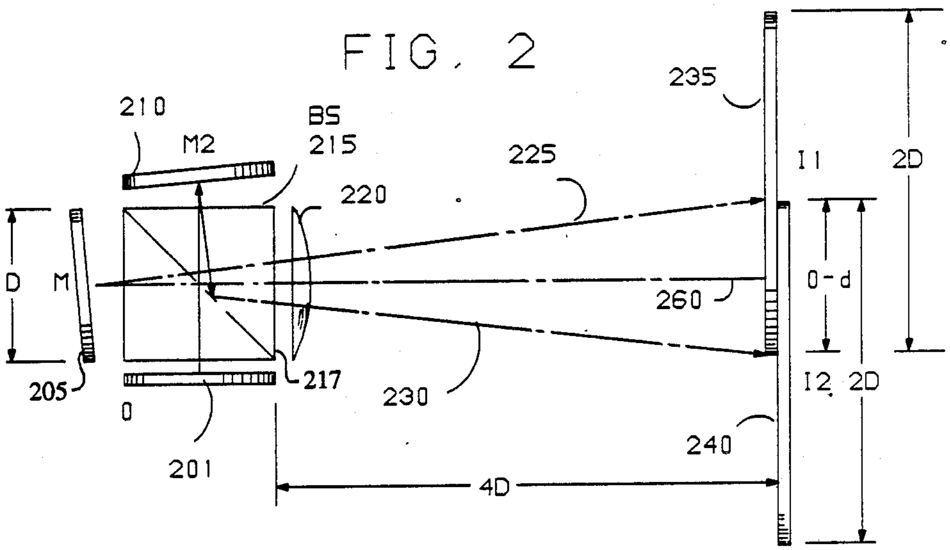
FIG. 2 depicts one optical arrangement illustrative of the invention to perform the perfect shuffle.

FIG. 2 shows an optical perfect shuffle device illustrative of the invention. The device comprises source element plane 201, cubic beam splitter 215, mirrors 205 and 210, lens 220, and superimposed image planes 235 and 240. Source element plane 201 has a two-dimensional binary bit array thereon. Each binary one element may be derived from a location on a plate that is transparent to a light beam, and each binary zero element may be derived from a location on the plate that is opaque to said light beam.

Light passing through plate 201 enters beam splitter 215 which causes a portion of the beam to pass therethrough to mirror 210 and a portion of the beam to be deflected to mirror 205. Mirror 205 is set at an angle so that the beam portion reflected therefrom is deflected above optical axis 260 of the beam splitter. Mirror 210 is set at an angle whereby the beam portion therefrom is deflected below the beam splitter center line. The beam portions reflected by the mirror pass through magnifying lens 220. The magnified beam portion reflected from mirror 205 forms an image on plane 235, and the magnified beam portion reflected from mirror 210 forms an image on plane 240. Each of planes 235 and 240 may comprise a transparent plate, a plane of optic fiber ends or other terminations well known in the art.

As indicated in FIG. 2, beam splitter 215 has a predetermined width D and the distance between beam splitter end 217 and image planes 235 and 240 is 4D. Each image plane has a width of 2D and a lens 220 is selected so that the magnified image on plate 235 as well as the magnified image on plate 240 is 2D and the images of the elements from source plate 201 are doubled. By selecting the tilt angles of mirrors 205 and 210 to be approximately 2.9 degrees, the overlapping sections of image planes 235 and 240 contain an image of the elements in shuffled order.

Figure 3:
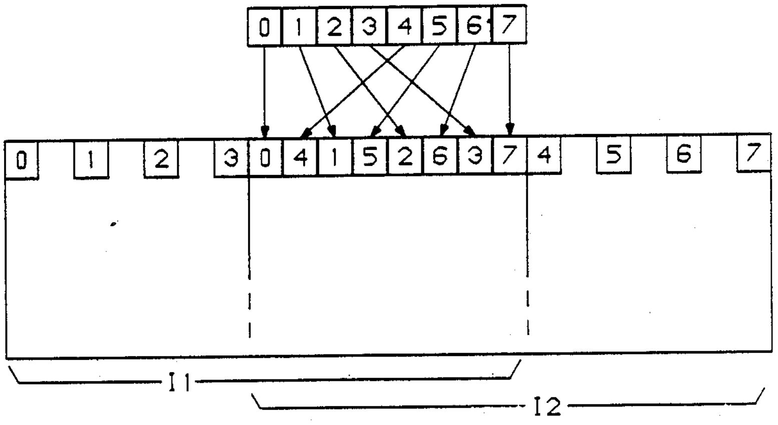
FIG. 3 shows the rearrangement of information elements performed by the apparatus of FIG. 1.

FIG. 3 shows a view of overlapped image plates 235 and 240 with the elements appearing thereon identified. In the overlapping portion the sequence of elements is E0, E4, E1, E5, E2, E6, E3 and E7 corresponding to the perfect shuffling order. The shuffled order element overlapping region may be further processed optically or detected by arrangements well known in the art. The nonoverlapping portions may be discarded.

As is readily seen from FIG. 2, the arrangement therein may be used to perform a parallel perfect shuffle of a two-dimensional array. In general, the arrangement is adapted to produce permutations of information elements by interlacing shifted copies of the input array. Such arrangements may include the inverse perfect shuffle. The beam passing through plane 201, however, is split so that the intensity of the light beam for each element on the overlapping image planes 235 and 240 is reduced. As is well known in the art, beam splitter 215 could be a polarizing type beam splitter and mirrors 205 and 210 may have quarter wave plates on surfaces facing the polarizing beam splitter to maintain the maximum possible beam intensity.

Figure 4:
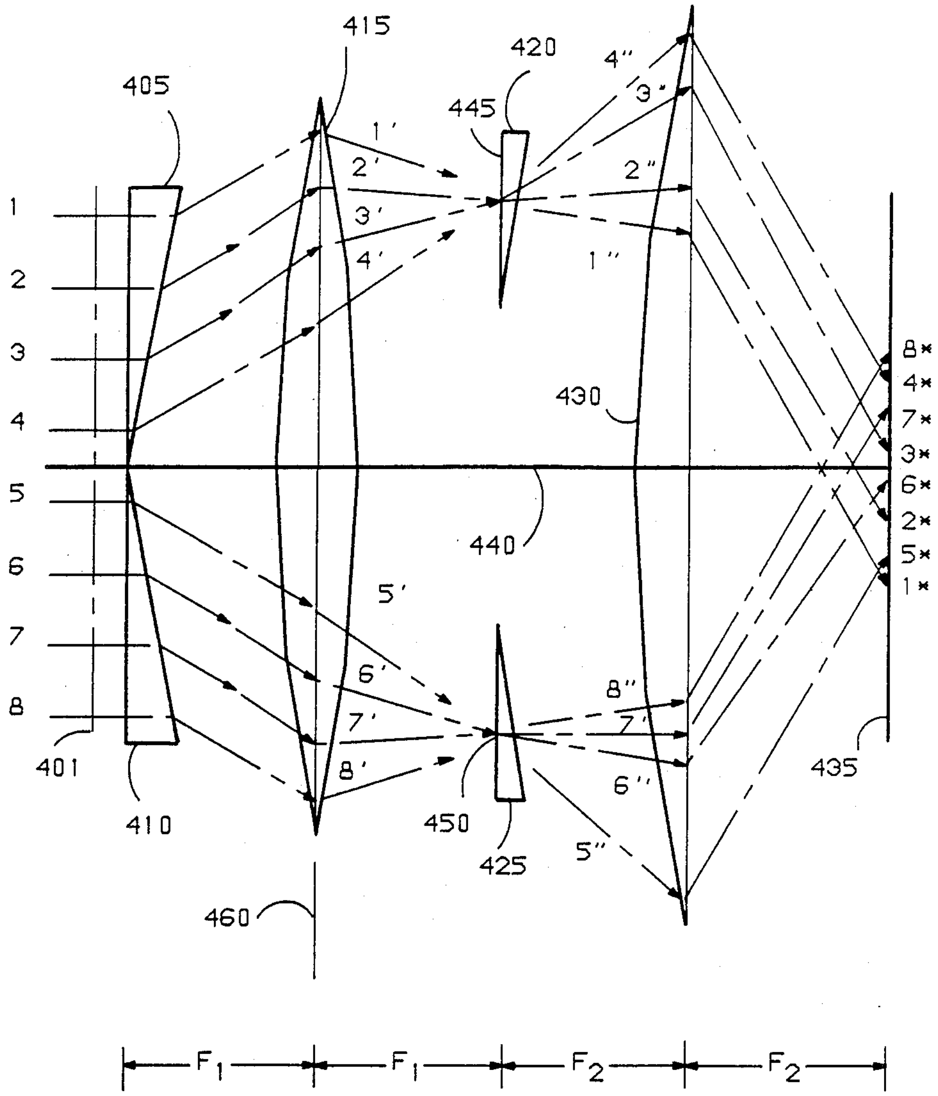
FIG. 4 depicts another optical arrangement illustrative of the invention to perform perfect shuffling without splitting information bearing light beams.

Another arrangement to perform light beam information permutations is shown in FIG. 4. Advantageously, the optical configuration of FIG. 4 does not involve beam splitting. Consequently, the light beam intensity on the output image plane therein is only slightly diminished by the losses in the light beam paths. The structure of FIG. 4 comprises input plane 401, deflecting prisms 405 and 410, Fourier transform lens 415, deflecting prisms 420 and 425, inverse Fourier transform lens 430 and output image plane 435.

Input image plane 401 may comprise a plate having spaced locations thereon. The space between locations may be as small as 10 microns and the location size may be as small as 4 microns. Each location may be opaque or transparent to provide distinguishable information. A source of at least partially coherent light is supplied to the input plane from the left side thereof. Alternatively, the information may be placed on the coherent beams by other means such as light beam logic gates so that the beams are incident on the vertical sides of prisms 405 and 410. As shown in FIG. 4, the information elements 1 through 8 are spaced vertically so that the intersection of the vertices of prisms 405 and 410 falls between the central elements 4 and 5. Thus elements 1 through 4 are deflected upward by prism 405 while elements 5 through 8 are deflected downward by prism 410.

The parallel beams corresponding to elements 1 through 4 are applied to the upper half of Fourier transform lens 415. Lens 415 is adapted to direct these beams to point 445 on the vertical side of prism 420 a distance F1 from vertical center line 460 of the Fourier transform lens. In similar manner, the beams for elements 5 through 8 are applied to the lower half of lens 415 so that they are directed to point 450 on the vertical side of prism 425. The vertical sides of prisms 420 and 425 are located at distances F2 from the vertical side of inverse Fourier lens 430 and the prisms are operative to deflect the beams passing through points 445 and 450 outwardly from center axis 440. Consequently, the beams for information elements 1 through 4 are redirected by inverse Fourier lens 430 and form parallel beams upon leaving the inverse Fourier transform lens. These parallel beams are angled downwardly to intersect center axis 440. The direction of the beams for information elements 5 through 8 is altered by inverse Fourier transform lens 430 so that these form a set of parallel beams at an angle that upwardly interacts center axis 440. The prism angles, the Fourier and inverse Fourier lens, and the distance F1 and F2 are arranged so that the information elements at output image plane 435 are in shuffled order 8, 4, 7, 3, 6, 2, 5, 1. For example, the wedge angles of prisms 405 and 410 may be 10 degrees, the wedge angles of prisms 420 and 425 may be 2 degrees, distance F1 equal to the focal length of lens 415 and may be 10 cm and distance F2 equal to the focal length of lens 430 may be 10 cm. Fourier transform lens 415 and inverse Fourier lens 430 may both be of the achromats air spaced broad band coated lens type produced by Spindler and Hoyer, Goettingen, Germany.

Figure 5:
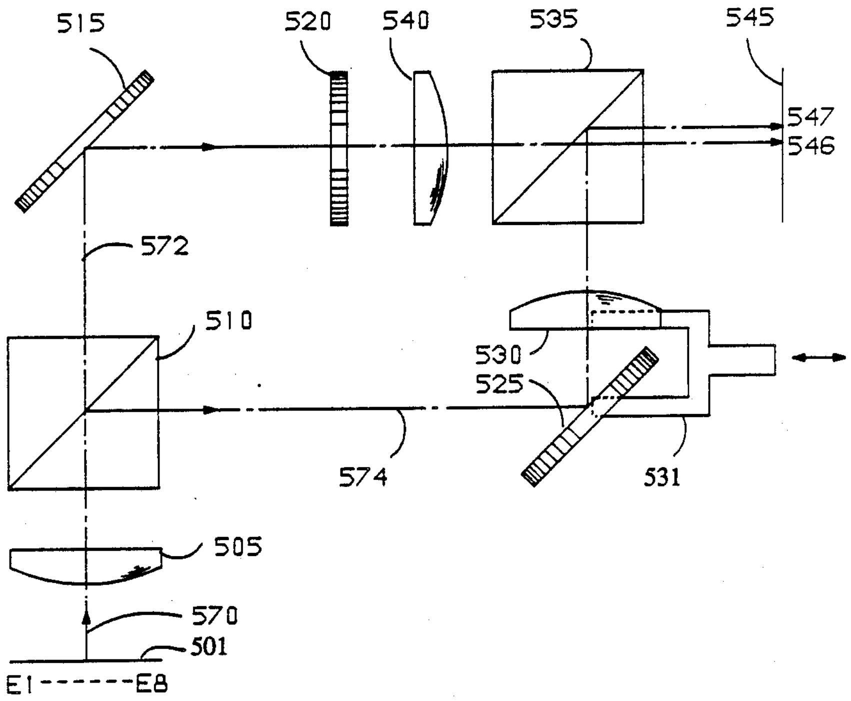
FIG. 5 shows yet another optical arrangement illustrative of the invention in which the information bearing light beams are of the same length.

The optical arrangement of FIG. 4 provides permutations of information elements such as the perfect shuffle and the inverse perfect shuffle without the splitting of information bearing light beams. It is often important, however, to maintain the same light beam path distances for all the information element beams. As is readily seen from FIG. 4, the path distances for the various information element beams are different. This is particularly evident when the element light beams are acted upon in parallel by optical type gates such as those described in the article, "Use of a single nonlinear Fabry-Perot etalon as optical logic gates," by J. L. Jewell, M. C. Rushform, and H. M. Gibbs appearing in *Applied Physics Letters*, Vol. 44 (2), Jan. 15, 1984, pp. 172–174. FIG. 5 shows yet another optical system that features equal distance paths for all element beams. Additionally, the relative shift between the two optical paths is adjustable.

The optical structure of FIG. 5 includes input image plane 501 adapted to receive information bearing optical beams from a beam source (not shown). The beam source may be, for example, a two-dimensional array of spaced beams arranged in a predetermined grid pattern. At each light beam location on the grid, the beam may be on or off to form a binary bit sequence at a femtosecond rate. The beams are thereby modulated by information elements. Each beam is polarized at a 45 degree angle.

After passing through plane 501, the polarized beams, e.g. beam 570, is applied to Fourier transform lens 505 which converts the diverging beam rays into parallel rays impinging on polarizing beam splitter 510. The vertical components of the polarized rays (beam 572) pass through beam splitter 510, are reflected by mirror 515 and are applied to inverse Fourier transform lens 540. This inverse Fourier transform lens is adapted to focus the rays passing therethrough at a point 546 on output image plane 545. This path from lens 520 to plane 545 includes path length compensating delay 520 and polarizing beam splitter 535.

The horizontally polarized beams at input image plane 501 are changed into parallel rays by Fourier transform lens 505 and are deflected 90 degrees by polarizing beam splitter 510. The deflected rays (beam 574) impinge on mirror 525 and are redirected therefrom to inverse Fourier transform lens 530. Lens 530 is adapted to cause the parallel rays from a particular beam to converge to a predetermined point 547 on output image plane 545 after being deflected by polarizing beam splitter 535. Lens shifter 531 to which mirror 525 and lens 530 are rigidly connected is adapted to move the mirror and lens combination horizontally whereby the positions of the horizontally polarized beams on output image plane 545 are shifted. The shift in positions of these horizontally polarized beams is precisely controlled by the position of mirror 525 to be an integral number of array locations. This mirror location may be adjusted to provide a shift of one or more beam positions on output image plane 545. Such a beam shifting arrangement according to the invention provides perfect shuffle or other information element rearrangements. Where the information elements for a row at input image plane 501 is E1, E2, E3, E4, E5, E6, E7, and E8 as shown in FIG. 5, adjusting the position of mirror 525 so that the beams coming therefrom are shifted 4.5 array locations to the right results in a perfect shuffled order within a predetermined portion of the output plane.

Figure 6:
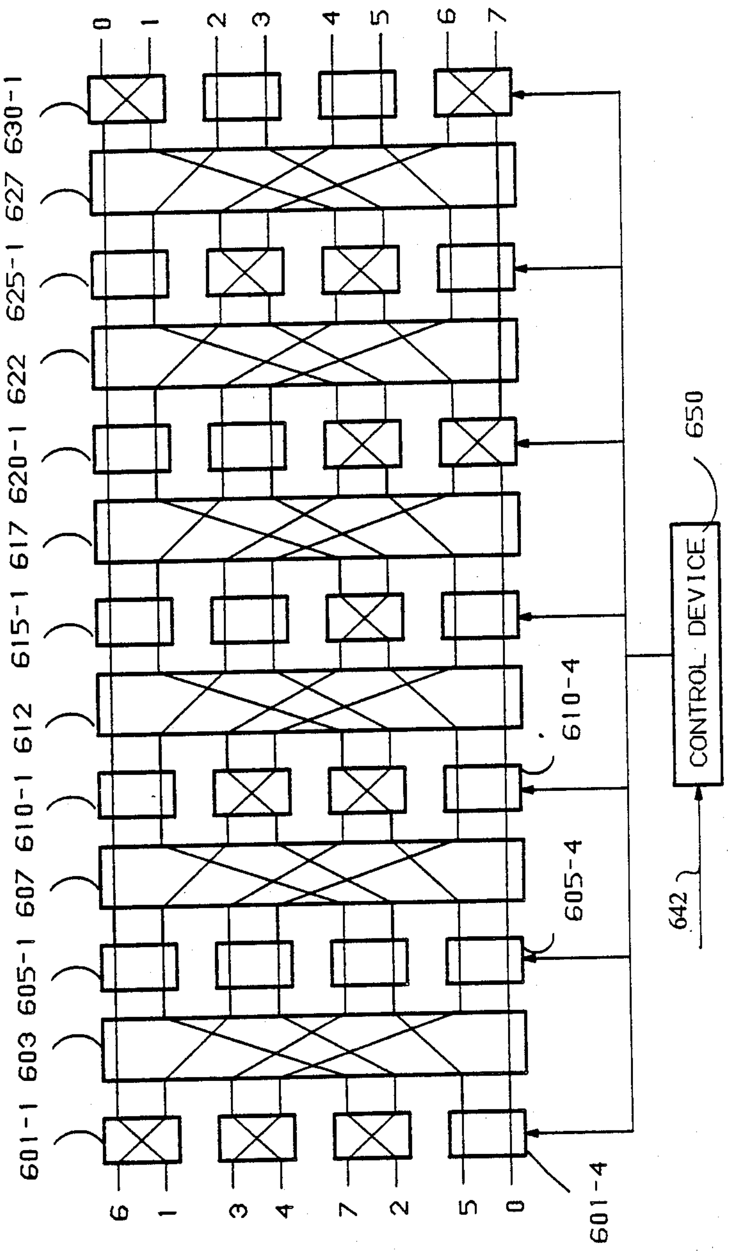
FIG. 6 illustrates a switching arrangement utilizing perfect shuffle interconnection arrangements.

An arrangement that utilizes the perfect shuffle technique in an interconnection network such as the well-known Omega network described in the article, "A Survey of Interconnection Networks," by Robert J. McMillen appearing in the *Conference Record* of the 1984 *IEEE Global Telecommunications Conference,* Vol. 1, pp. 105–113, November 1984, is shown in FIG. 6. Referring to FIG. 6, a set of 8 input optical fiber lines are connected to optical directional coupler switches 601-1 through 601-4 in top to bottom order 6,1,3,4,7,2,5,0. These numbers correspond to the destination addresses of the input lines. More specifically, the topmost input line (0) is to be connected to output line 6, and the bottom input line is to be connected to output line 0 as indicated. The output lines from optical directional switches 630-1 through 630-4 are in top to bottom order 0,1,2,3,4,5,6,7 as indicated. For the 8 lines to be switched, there are 7 stages of directional coupler switches.

Each successive pair of switches in FIG. 6 is connected through a perfect shuffle interconnection device suchas the arrangement shown and described with respect to FIG. 5. For example, switches 601-1 through 601-4 of the input stage are connected to switches 605-1 through 605-4 of the next successive switching stage through perfect shuffle network 603. In like manner, perfect shuffle networks 607, 612, 617, 622 and 625 interconnect the succeeding pairs of switching stages. The perfect shuffle devices provide a regular switching stage interconnect scheme that is particularly important in optical networks where light beam direction changes are limited.

The directional switches of FIG. 6 may be electrooptic type directional couplers such as described in the articles, "Guided-Wave Devices for Optical Communication," by Rod C. Alferness appearing in the *IEEE Journal of Quantum Electronics,* Vol. QE-17, No. 6, June 1981, and "Waveguide Electrooptic Modulators" by Rod C. Alferness appearing in the *IEEE Transactions on Microwave Theory and Techniques,* Vol. MTT-30, No. 8, August 1982. Each coupler is operative to either connect through as indicated, for example, with respect to coupler switch 601-4 or to crossover as indicated with respect to coupler switch 601-1. The switching state of each coupler switch is controlled by electrical signals from computer device 650 in accordance with the required network interconnection pattern. The arrangement of FIG. 6 may be used for packet-type switching or for circuit-type switching, and the states of the coupler switches will vary according to the interconnect information supplied to device 650 on line 642. Alternatively, optical logic devices such as disclosed in the aforementioned article by Jewell, Rushform and Gibbs may be used as the directional coupler switches.

Figure 7:
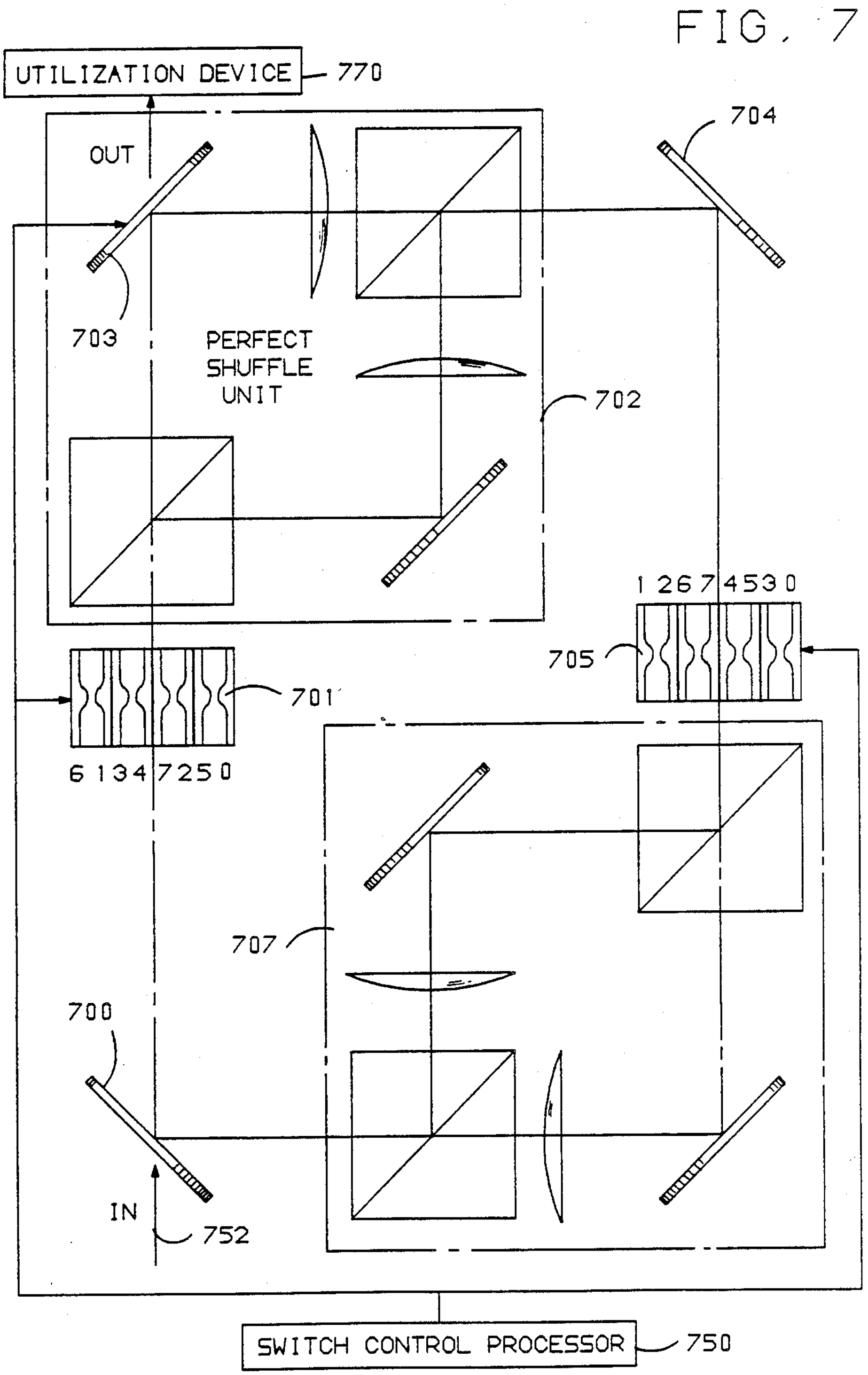
FIG. 7 shows an optical switching system in which the shuffle arrangements of FIG. 5 are incorporated.

FIG. 7 illustrates how the optical perfect shuffle arrangement of FIG. 5 may be incorporated into an interconnection network to perform the switching operations of FIG. 6. Directional couplers 701 and 705 are shown as line array switches. It is to be understood that the directional couplers could be of the two-dimensional type to accommodate a two-dimensional array of light beam elements. Mirrors 701 and 703 are constructed to be switchable so that they may be reflecting or transmitting as controlled by either an electrical or an optical signal from control processor 750. The mirrors may be of the type described in the aforementioned article by J. Jewell et al or of the liquid crystal light valve type described by B. Clylmer and S. A. Collins in the article, "Optical Computer Switching Network," appearing in *Optical Engineering,* Vol. 24, No. 1 (1985). In FIG. 7, the input light beams in the same order as in FIG. 6 pass through mirror 700 while it is in its transmitting state. The light beams from mirror 700 are applied to directional coupler switch array 701 which is controlled by device 750 to provide the same switching configuration as coupler switches 601-1, through 601-4 in FIG. 6. The light beams pass through directional coupler switch 701 so that the order of the beams is changed to 6,4,3,2,7,5,0 as indicated and enter perfect shuffle unit 701. As described with respect to FIG. 5, unit 701 is operative to interleave the light beams, and the interleaved beams are supplied to the input of directional coupler switch 705 in 1,2,6,7,4,5,3,0 order. Directional coupler 705 operates in the same manner as coupler switches 605-1 through 605-4 in FIG. 6, and as in FIG. 6 there is no crossover of the light beams. Perfect shuffle unit 707 which corresponds to shuffle device 607 in FIG. 6 is operative to interleave the light beams from coupler 705 so that the order 1,4,2,5,6,3,7,0 results at its output. This order corresponds to the output at shuffle device 607.

At this point in the operation of the circuit of FIG. 7, mirror 700 along path 752 is switched to its reflecting mode. Consequently, the input beams are cut off, and the beams exiting from perfect shuffle unit 707 are reflected onto switch 701. The control signals to coupler switches 701 and 705 are modified so that their switching states correspond to those of coupler switches 610-1 through 610-4 and 615-1 through 615-4, respectively, and the circuit of FIG. 7 performs the operations of coupler switch 610, shuffler 612, coupler switch 615 and shuffler 617. The light beams emerging from perfect shuffle unit 707 as a result of the first reentrant beams therefrom are then in 1,2,4,5,3,7,6,0 order in conformance with the operation of switch 610, shuffler 612, switch 615 and shuffler 617 of FIG. 6.

When the beams emerge from shuffler 707 the second time, the states of coupler switches 701 and 705 are again modified to conform to the states of switches 620-1 through 620-4 and 625-1 through 625-4, respectively. The circuit of FIG. 7 then performs the functions of switching stage 620, shuffler 622, switching stage 625 and shuffler 627 of FIG. 6 so that the light beams emerge from shuffler 707 in the same order as those from shuffler 627 in FIG. 6. Coupler switch 701 is then placed in the switching states shown with respect to coupler switch 630, and the light beams from shuffler 707 are passed therethrough via mirror 700. Mirror 703 of perfect shuffler device 702 is placed in its transmittal mode by a signal from control device 750, and the light beams impinging thereon are supplied in 0,1,2,3,4,5,6,7 order to utilization device 770. The network interconnections of FIG. 6 are thereby accomplished. Mirror 700 may then receive another set of light beam information signals which may be switched as controlled by signals from control computer 750.

Figure 8:
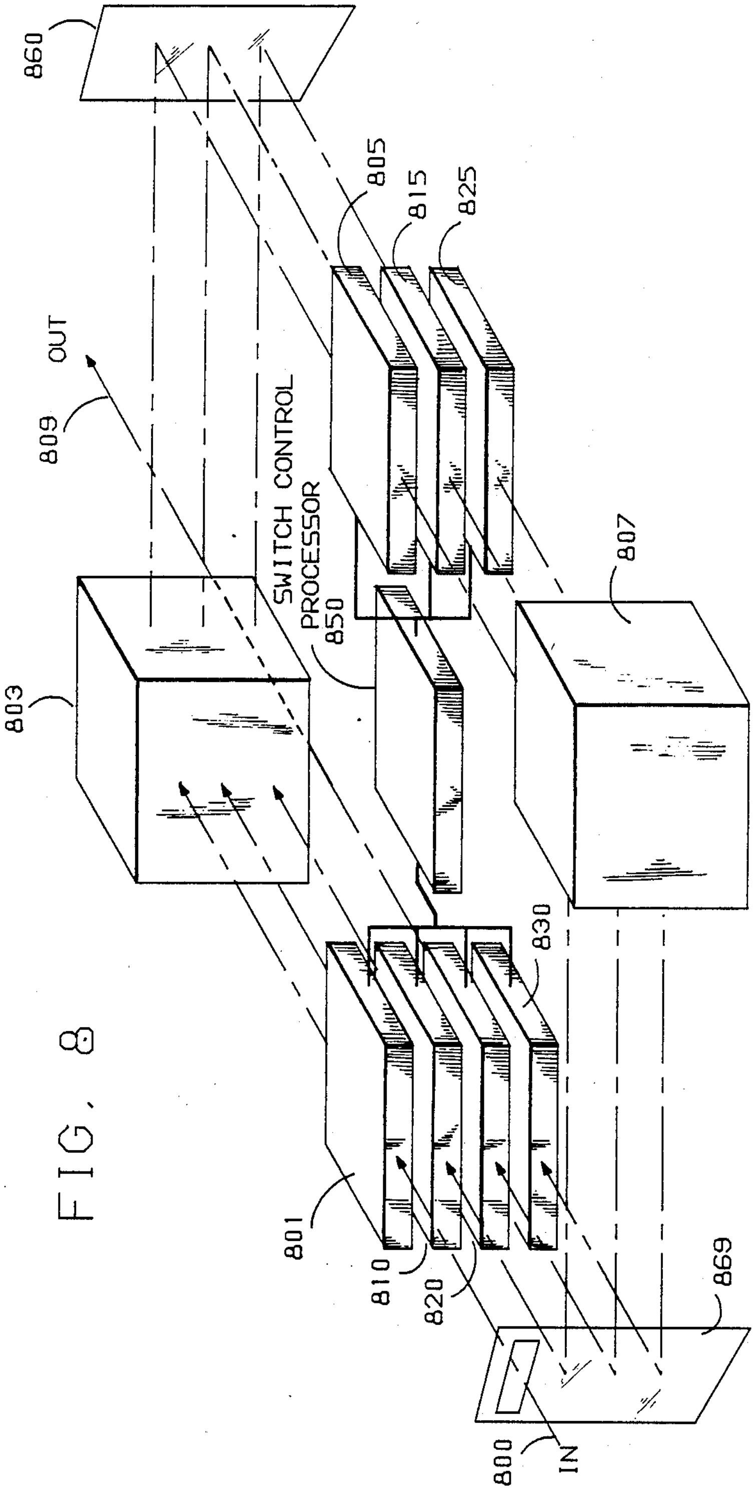
FIG. 8 shows another optical switching circuit in which the shuffle circuit of FIG. 5 is used.

Another mode of operation is illustrated in the circuit of FIG. 8. FIG. 8 shows a multi-level optical switching network that performs the operations of the circuit of FIG. 6 utilizing the perfect shuffle device of FIG. 5. In FIG. 8, directional coupler switches 801, 805, 810, 815, 820, 825 and 830 are controlled by switch control processor 850. The states of the directional couplers are the same as in FIG. 6. For example, device 801 comprises a set of 4 directional couplers which are equivalent to directional coupler switches 601-1 through 601-4 in FIG. 6. The 3 left side directional couplers of device 801 are set to their crossover states (not indicated) as are directional coupler switches 601-1 through 601-3, and the rightmost coupler of device 801 is set to its direct connection state (not indicated) as is coupler switch 601-4. A perfect shuffler interconnects each pair of directional coupler switches. Perfect shuffle device 803 is interposed between directional coupler switches 801 and 805 and is extended so that it is also interposed between directional coupler switches 810 and 815 as well as between coupler switches 820 and 825. Perfect shuffle device 807 is connected between coupler switches 805 and 810, coupler switches 815 and 820, and switches 825 and 830.

The 8 light beams incident on directional coupler switch 801 through the slot in mirror 869 are represented by centered single beam 800. These beams are directed in spiral-like fashion through the network of FIG. 8. Mirrors 860 and 869 are arranged to complete the spiral path from the shuffle devices to the succeeding directional coupler switch. As described with respect to FIG. 6, the beams incoming to the network may be in the order shown at the left side of FIG. 6. With switch control processor 850 providing the control signals as in FIG. 6, the beams are crossed over or passed through the sections of directional coupler switch 801, rearranged in perfect shuffler 803 and applied to directional coupler switch 805 via mirror 860. The beam array is passed through the shuffle and directional coupler devices placed so that the beams follow a downward spiral-like path through the network devices and emerge from coupler switch 830 as beam 809. Output beam 809 is representative of 8 beams which are ordered as indicated at the outputs of switches 630-1 through 630-4 in FIG. 6. As described with respect to FIG. 6, the directional coupler switches of FIG. 8 may be replaced by optical logic devices, and the control arrangements may be used for packets where the address information is contained in a packet header. Advantageously, the network may extend to a large number of lines, and the optical switching may be accomplished in the order of femtoseconds.

The invention has been illustrated and described with reference to particular embodiments thereof. It is to be understood, however, that various changes and modifications may be made by those skilled in the art without departing from the spirit and scope of the invention.

What is claimed is:

1. An optical information switching arrangement for rearranging an applied ordered array of information-bearing light beams comprising:

means for receiving an array of information-bearing light beams;

means for directing said light beams along a plurality of optical paths and for projecting at most two images of the ordered array of information-bearing light beams that travel along said optical paths onto a preselected overlap area of said means for receiving;

means for adjusting the optical paths relative to each other to rearrange the order of said projected information of said two images to form a perfect shuffle of said ordered array of information-bearing light beams within said overlap area; and means for accepting said perfect shuffle rearranged information in said overlap area.

2. An optical information switching arrangement according to claim 1 further comprising:

array switching means responsive to said formed perfect shuffle of said information-bearing light beams to reverse positions, in response to control signals, of pairs of said formed perfect shuffle information-bearing light beams.

3. An optical information switching arrangement according to claim 2, further comprising:

means for directing output signals of said array switching means to a second optical information switching arrangement, forming a switched array input to said second optical information switching arrangement, where said second optical information switching arrangement comprises:

second means for receiving an array of information-bearing light beams;

second means for directing said switched array input along a plurality of optical paths and for projecting at most two images of said switched array input that travel along said optical paths onto a preselected overlap area of said second means for receiving; and second means for adjusting the optical paths of said second means for directing, relative to each other, to rearrange the order of the information projected by said second means for directing of said two images to form a perfect shuffle of said switched array input within said overlap area of said second means for receiving.

4. Apparatus for developing a rearranged information array from a given information array comprising:

a surface for receiving said rearranged information means for developing secondary beams from a beam carrying said given information array, and directing not more than two of said secondary beams to said surface for receiving; and means for directing said two secondary beams to develop overlapping images of said given array on said surface, and for controlling the degree of overlap of said two images to form thereby a perfect shuffle rearranged information array in the overlap area of said images.

5. The apparatus of claim 4 wherein said means for developing a beam splitter.

6. Apparatus for rearranging an optical information array comprising:

an optical beam containing said information array;

a beam splitter, responsive to said beam, for developing a first intermediate beam and a second intermediate beam; and means outside of said beam splitter for directing said first intermediate beam onto a receiving surface along a first path and for directing said second intermediate beam onto said receiving surface along a second path, with said first path and said second path being selected to create an image of said second intermediate beam on said receiving surface that at least partially overlaps an image of said first intermediate beam on said receiving surface to create a perfect shuffle image of said information array.

7. The apparatus of claim 6 wherein said means for directing comprises two mirrored surfaces.

8. The apparatus of claim 6 wherein said means for directing comprises a first mirrored surface for reflecting information of one face of said beam splitter and a second mirrored surface for reflecting information of another face of said beam splitter.

9. The apparatus of claim 8 wherein said first mirrored surface forms an integral part of one outside face of said beam splitter and said second mirrored surface forms an integral part of a second outside face of said beam splitter.

10. Apparatus for optically transforming information comprising:

an array of information elements;

a plurality of optical paths for projecting at most two images of said array of information elements onto said means for receiving with said images at least partially overlapping each other;

means for shifting the optical paths relative to each other to rearrange the projected information elements of the array by controlling the degree of overlap of said two images; and means for receiving optically distinguishable information elements developed by said means for shifting;

wherein:

said array of information elements comprises a planar array of optically distinguishable information elements;

said plurality of optical paths comprises first and second optical paths for projecting information elements from said array to said receiving means;

said first optical path including means for transferring said optically distinguishable information elements to said receiving means along a first distinct path;

said second optical path including means for transferring optically distinguishable information elements along a second distinct path shifted relative to said first distinct path to said receiving means; and the shifting of said second distinct path relative to said first distinct path being selected to permute the optically distinguishable information elements at said receiving means with respect to said array so as to form a perfect shuffle of said array of information elements.

11. Apparatus for optically transforming information according to claim 10 wherein:

said array of information comprises a planar array of light elements;

said first optical path includes a first mirror for reflecting the image of the planar array of light elements along a first direction;

said second optical path including a second mirror for reflecting said image of the planar array of light elements along a second direction shifted relative to said first direction; and a lens along said first and second directions for magnifying said images of the planar array of light elements.

12. Apparatus for transforming optical information according to claim 10 wherein:

said first and second paths include a Fourier transform lens, and an inverse Fourier transform lens along a common optical axis;

said first path further comprises means for directing a first portion of said optical information elements to a first section of said Fourier transform lens at a fixed distance from said first portion directing means; and means for receiving said first portion of said optical information elements from said Fourier transform lens and for redirecting said received first portion optical information elements to a first section of an inverse Fourier transform lens located a fixed distance from said redirecting means;

said inverse Fourier transform lens being arranged to direct said first portion of said optical information elements incident thereon along a first predetermined direction to said receiving means;

said second path comprises means for directing a second portion of said optical information elements to a second section of said Fourier transform lens; and means for receiving said second portion of said optical information elements from said Fourier transform lens and for redirecting said received second portion optical information elements to a second section of said inverse Fourier transform lens;

said inverse Fourier transform lens being arranged to direct said optical information elements incident thereon along a second predetermined direction to said receiving means;

said first and second predetermined directions being selected to permute the optical information elements of said first and second portions.

13. Apparatus for transforming optical information according to claim 10 wherein:

said first and second paths include light beam splitting means for dividing a light beam into a pair of differently directed light beams and light beam combining means spaced a predetermined distance from said light beam splitting means for redirecting a pair of differently directed light beams to a common direction path;

said first path further comprising means for redirecting one set of light beam elements from said beam splitter means to said beam combining means and means for equalizing the lengths of said first and second paths;

said second path comprising means for redirecting the other set of light beam elements from said beam splitter to said beam combining means and means for shifting the point at which its redirected light beam elements enter said beam combining means;

said shifting means and said means for equalizing being adjusted to permute the light beam elements at said beam combining means.

* * * * *